(12) United States Patent
Smith et al.

(10) Patent No.: US 8,106,529 B2
(45) Date of Patent: Jan. 31, 2012

(54) FARM IMPLEMENTS WITH CAPACITOR FOR PEAK ELECTRIC LOADS

(75) Inventors: Kevin M. Smith, Narvon, PA (US); Christopher A. Foster, Denver, PA (US); Richard P. Strosser, Akron, PA (US); Mark K. Chow, Paoli, PA (US)

(73) Assignee: CNH America LLC, New Holland, PA (US)

( * ) Notice: Subject to any disclaimer, the term of this patent is extended or adjusted under 35 U.S.C. 154(b) by 207 days.

(21) Appl. No.: 12/551,003

(22) Filed: Aug. 31, 2009

(65) Prior Publication Data

US 2011/0053385 A1     Mar. 3, 2011

(51) Int. Cl.
*B60L 1/00* (2006.01)
(52) U.S. Cl. .......................................... 307/9.1
(58) Field of Classification Search ................ 307/9.1
See application file for complete search history.

(56) References Cited

U.S. PATENT DOCUMENTS

| | | | |
|---|---|---|---|
| 4,603,379 A | 7/1986 | Strosser et al. | |
| 4,771,657 A | 9/1988 | Iwatsuki | |
| 5,226,359 A | 7/1993 | Rempe | |
| 5,243,522 A | 9/1993 | Salzmann | |
| 5,444,623 A | 8/1995 | Genise | |
| 5,513,718 A | 5/1996 | Suzuki et al. | |
| 5,551,218 A | 9/1996 | Henderson et al. | |
| 5,631,826 A | 5/1997 | Chow | |
| 5,687,548 A | 11/1997 | McClure et al. | |
| 5,692,365 A | 12/1997 | Meyer et al. | |
| 5,723,956 A * | 3/1998 | King et al. ............... 318/139 |
| 6,161,368 A | 12/2000 | Wilkens et al. | |
| 6,193,175 B1 | 2/2001 | Andersson et al. | |
| 6,339,741 B1 | 1/2002 | Ritter et al. | |
| 6,428,446 B1 | 8/2002 | Ohtsuka | |
| 6,446,548 B2 | 9/2002 | Chow | |
| 6,580,945 B2 | 6/2003 | Mulhauser et al. | |
| 6,651,416 B2 | 11/2003 | Trelstad et al. | |
| 6,681,688 B1 | 1/2004 | Smith | |
| 6,763,761 B1 | 7/2004 | Smith | |
| 6,769,353 B1 | 8/2004 | Smith et al. | |
| 6,811,015 B2 | 11/2004 | Tietze | |
| 6,904,851 B2 | 6/2005 | Memory | |
| 6,981,352 B2 | 1/2006 | Chow et al. | |
| 7,404,355 B2 | 7/2008 | Viaud et al. | |
| 7,417,408 B2 | 8/2008 | Poyhonen et al. | |
| 7,432,616 B2 | 10/2008 | Hatai et al. | |
| 7,448,316 B2 | 11/2008 | Posselius | |
| 7,459,888 B2 | 12/2008 | Schulte et al. | |
| 7,464,523 B2 | 12/2008 | Vande Ryse et al. | |
| 7,471,068 B2 | 12/2008 | Cegnar | |
| 2004/0090195 A1 | 5/2004 | Motsenbocker | |
| 2004/0217645 A1 | 11/2004 | Ponet et al. | |
| 2007/0001616 A1 | 1/2007 | Puccetti et al. | |

(Continued)

*Primary Examiner* — Robert L. Deberadinis
(74) *Attorney, Agent, or Firm* — Patrick M. Sheldrake

(57) ABSTRACT

A farm implement towed or pushed by a vehicle includes at least one electrically actuated device mounted for operation and a high capacitance capacitor connected in circuit with the device and with a source of electricity on the vehicle. Electric power is supplied from the vehicle to the implement at a nominal rate to charge the capacitor and/or operate the device. The capacitor is selectively discharged to either supplement the electric power supplied by the vehicle to the device or to completely power the device such that the device is provided with electric power for operation at a peak rate exceeding the nominal rate electric power is supplied from the vehicle to the capacitor and/or the device.

19 Claims, 3 Drawing Sheets

U.S. PATENT DOCUMENTS

| | | |
|---|---|---|
| 2007/0068714 A1 | 3/2007 | Bender |
| 2007/0142994 A1 | 6/2007 | Boecker et al. |
| 2008/0081244 A1 | 4/2008 | Hammond |
| 2008/0094042 A1 | 4/2008 | Ferrario |
| 2008/0111423 A1 | 5/2008 | Baker et al. |
| 2008/0129219 A1 | 6/2008 | Smith et al. |
| 2008/0135357 A1 | 6/2008 | Lang |
| 2008/0215200 A1 | 9/2008 | Toth |
| 2008/0224445 A1 | 9/2008 | Viaud et al. |
| 2008/0246443 A1 | 10/2008 | Doljack |
| 2008/0246452 A1 | 10/2008 | Sievers et al. |
| 2008/0278117 A1 | 11/2008 | Tarchinski |
| 2008/0282647 A1 | 11/2008 | Hood et al. |
| 2008/0290842 A1 | 11/2008 | Davis et al. |
| 2009/0261799 A1* | 10/2009 | Illipe et al. .................... 323/293 |

\* cited by examiner

FARM IMPLEMENTS WITH CAPACITOR
FOR PEAK ELECTRIC LOADS

BACKGROUND OF THE INVENTION

Many towed or pushed farm implements need to draw electricity from the vehicle connected to the implement to power certain implement functions. These usually include at least power for lights to permit road movement and/or operate in darkness or poor lighting. The electrical connections typically provided on North American tractors and farm implements are sockets and plugs with multiconductor cables providing seven conductor connections. Typically, six of the conductors are dedicated to the implement lights and ground with only one conductor provided for auxiliary (other or non-dedicated) implement power.

The typical North American auxiliary power connection on farm implements is rated at up to 30 A per conductor. However, by the time voltage drop through the wiring and connector terminals is taken into account, only about 10 A can be provided for sustained end use and only about 15 A for peak loads on the implement. Some implement functions can impose an electric load exceeding these limits, particular peak load limits. If the current draw is sufficiently great, even if only for seconds of operation, special cabling and connections must be provided for both the tractor and implement to assure safety and reliability.

There is an International Standard (ISO) 11783 for the latest generation, implement-tractor communication and control coupling that provides for nine separate conductors/channels. Of these, three are dedicated to control of the coupling itself, two are dedicated to data transmission and the remaining four are dedicated to power and ground. Of the latter, one pair is dedicated to providing stable power and ground for electronics and only the remaining pair is dedicated to providing auxiliary power and ground for non-electronic components (e.g. lights, motors, etc.).

The ISO 11783 connection allocates only the one auxiliary conductor pair to supply all non-electronic power needs of the implement, including lights. The auxiliary power conductor pair are again specified for 30 A sustained, which would permit up to about 45 or 50 A peak. With losses, less than that amount of current will be supplied to satisfy the implement's non-electronic power needs. Of course, older equipment and even some new equipment lack these ISO 11783 connections. Moreover, some farm implements currently being sold already generate peak electrical loads of over 50 A. As performance and capacity of implements is constantly being pushed by market demand, it can be expected that more implements will likely exceed the capability of even this latest generation, ISO 11783 connection. Thus, special dedicated heavy capacity electric cables and connectors or at least a separate conventional power supply cable and connector are likely to continue to be required for many farm implements. Whether one or more than one power supply cable is provided all power has to be supplied by the vehicle 18 that is also used to operate the farm implement.

It would be highly desirable to provide farm implements that can be electrically coupled to a farm vehicle with standard electrical connectors designed to supply a relatively low, sustained flow of electric current (e.g. 10 A-15 A) and draw such a relatively low sustained flow from such connectors and yet intermittently supply on the implement, electric currents greater, even many times greater than the magnitude of the sustained flow of electric current from the farm vehicle to satisfy peak electric loads of the implement.

BRIEF SUMMARY OF THE INVENTION

In one aspect, the invention is a farm implement configured for mechanical and electrical coupling with a vehicle for operation and comprising: at least one electrically actuated device mounted for operation; an electric capacitor; an electrical power conductor configured to releasably connect with and receive electricity from the vehicle through a releasable electrical connector; and an electric control unit operably connected with the electrical connector through the electrical power conductor and with the capacitor and the at least one electrically actuated device so as to selectively control supply of the electricity from the electrical power conductor through the electrical connector to the capacitor and to the at least one electrically actuated device, the electric control unit further being configured to intermittently supply electric current from the capacitor to the at least one electrically actuated device such that the at least one electrically actuated device is supplied current at a rate in excess of a maximum rate electric current is supplied through the electrical connector to the farm implement.

Another statement of the invention is to a control apparatus on a farm implement for charging and discharging a capacitor comprising: a first branch including a first switch, said first branch extending between a source of electrical power off the implement and a node; a second branch including a second switch, said second branch extending between a load connected to a reference voltage off the implement and the node so as to make a complete circuit partially on and partially off of the implement; and a third branch including a capacitor in series with an inductor, said third branch extending between the reference voltage and the node; wherein: said first switch is activated for a plurality of first time periods to charge the capacitor to a predetermined voltage; and said second switch is activated for a plurality of second time periods to provide a current to the load.

In another aspect, the invention is a method of operating a farm implement configured for mechanical and electrical coupling with a vehicle for operation, the farm implement including at least one electrically actuated device mounted for operation, the method comprising the steps of: providing an electric connection on the farm implement to supply electricity to the farm implement from a source external to the implement for operation of the at least one electrically actuated device; supplying the electricity from the electrical connection to a capacitor on the farm implement to store the supplied electricity in the capacitor while the at least one electrically actuated device is not in operation; and intermittently supplying stored electricity from the capacitor to the at least one electrically actuated device to operate the at least one electrically actuated device.

In another aspect, the invention is an improvement in a vehicle propelled farm implement having at least one electrically actuated device and an electric control system operably coupled with the electrically actuated device to selectively control operation of the electrically actuated device during use of the farm implement. The improvement comprises a capacitor intermittently operably coupled with the at least one electrically actuated device by the electric control system to intermittently supply electric power to the at least one electrically actuated device to operate the at least one electrically actuated device.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

DETAILED DESCRIPTION OF THE INVENTION

Figure 1:
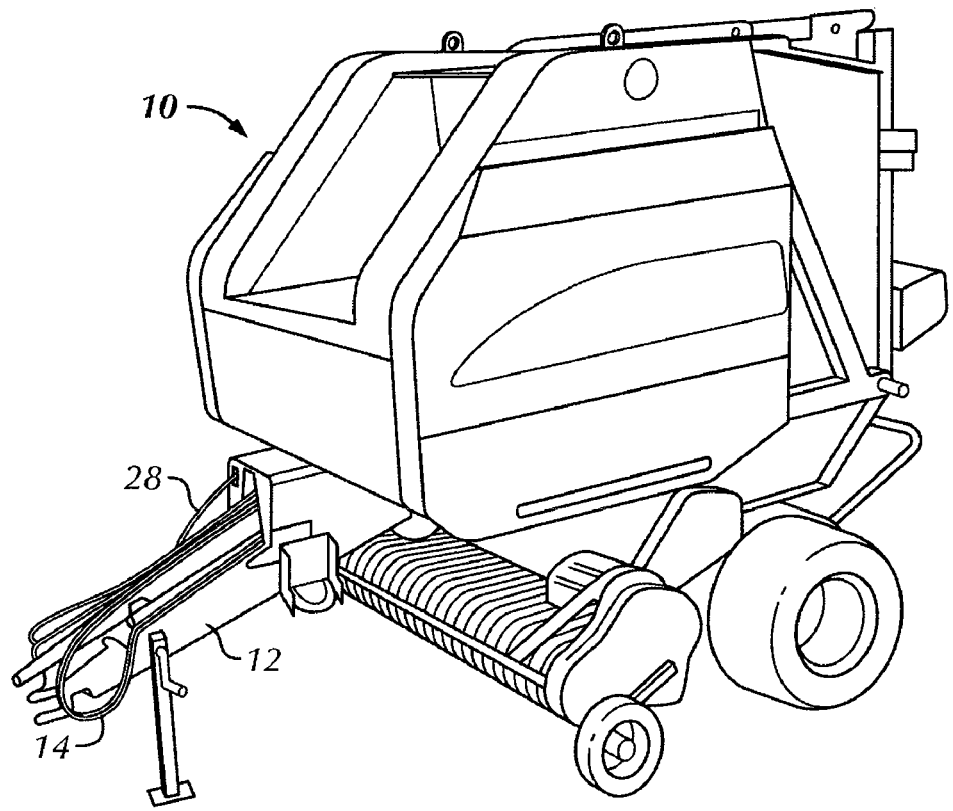
FIG. 1 depicts a exemplary farm implement embodying the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of identified element or assembly electronic learning device and designated parts thereof. The terminology includes the words noted above, derivatives thereof and words of similar import.

Figure 2:
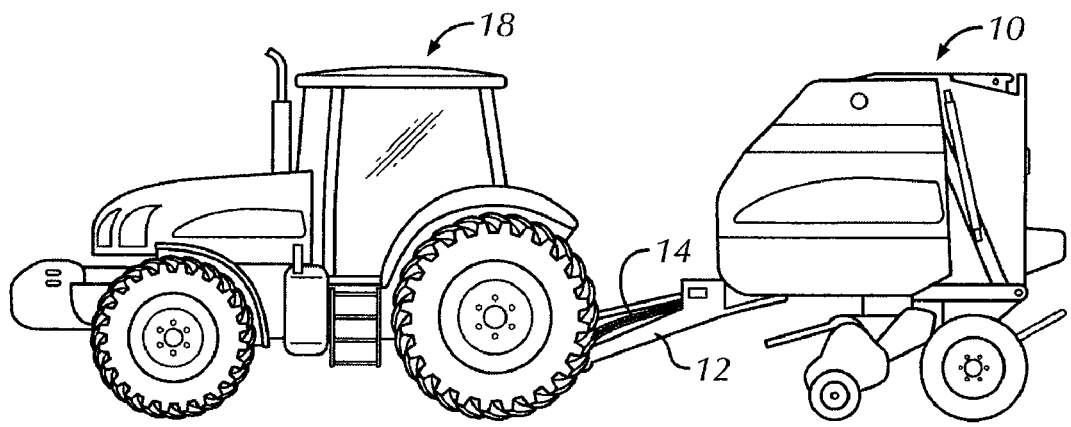
FIG. 2 depicts the farm implement of FIG. 1 mechanically and electrically coupled with a farm vehicle for operation.

The present invention is directed to a farm implement configured for mechanical and electrical coupling with a farm vehicle for operation. One such implement 10 is a round baler shown in FIGS. 1 and 2. In particular in reference to FIG. 1, baler 10 includes a tow bar or hitch 12 or the like for mechanical connection with a farm vehicle 18 such as a tractor as depicted in FIG. 2, but possibly a truck or crawler (neither depicted), for operation. The farm implement 10 also includes an electrical power cable 14 with a releasable electrical connector 16 in the form of a plug for releasable electrical connection with the farm vehicle 18. Vehicle 18 is conventionally provided with a plug socket at its rear end or plug sockets at the rear and front ends to electrically connect with a farm implement being respectively towed or pushed by the vehicle 18. Implement 10 may also be provided with a separate control signal cable 28 designed to carry even lower voltage (e.g. 5) and lower current (e.g. mA) control signals from operator controls in the vehicle 18 to control circuitry in the implement 10. Cable 28 would have its own plug to releasably connect with a dedicated plug socket (not depicted) on the vehicle 18.

Figure 3:
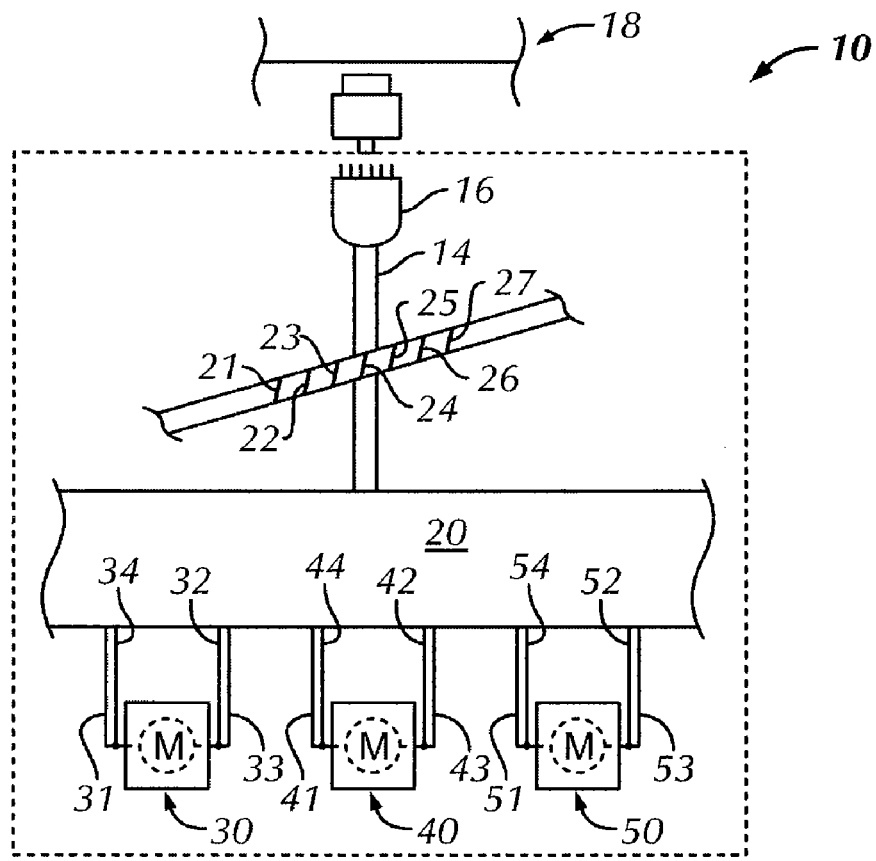
FIG. 3 is a block diagram part of the electrical circuitry of the farm implement of FIGS. 1 and 2.

Power cable 14 is conventionally provided with multiple electrical conductors seven electrical conductors 21-27 being typical, and is conventionally configured through the provision of an equal number of pins and/or blades in the plug 16 to releasably connect with and receive electricity from a plug socket (not depicted) on the vehicle 18. Referring to FIG. 3, typically, one electrical conductor 21 is dedicated to supplying electric power to the farm implement 10 for the operation of at least one electrically actuated device mounted for operation on the implement. Another electrical conductor 22 of the seven conductors is dedicated as an electrical return to set a reference level voltage, typically ground of the connected vehicle 18, to complete an electrical circuit between the vehicle 18 and all of the electrical devices of the farm implement 10. Conductor 22 provides a reference voltage such as vehicle ground and is usually connected with a reference level/ground bus 22' in the farm implement 10. Typically, the remaining five conductors 23-27 and their plug connectors are dedicated to other uses such as stop lights (2) and turn signals (2) for road towing and another for headlights and/or working lights. All electric power supplied the farm implement 10 to operate the farm implement 10 is supplied by the vehicle 18 through the cable 14 and the releasable connector plug 16.

FIG. 3 is a very simplified block diagram of some of the electrical circuitry of the round baler 10. Individual conductors 21-27 of the cable 14 are connected with an electrical control unit ("ECU") 20 in the implement and indicated in block diagram form, in the figure. Lines 23-27 may be directly coupled with the various lights so that they might be activated directly by the vehicle driver from the vehicle 18. Baler 10 is shown having three electrically actuated devices mounted for operation on the implement 10: a net feed motor or like actuator 30, a twine feed motor or like actuator 40 and a bale slice motor or like actuator 50. Other farm implements including other balers may have the same or different electrically actuated devices greater or lesser in number than three for operation. Details regarding the construction and operation of existing round balers can be found in various references including but not limited to U.S. Pat. Nos. 4,603,379, 5,631,826, 5,687,548, 5,692,365, 6,446,548 and 6,981,352, all incorporated by reference herein in their entireties.

Conductor 21 is connected to the ECU 20 for distribution of electricity from vehicle 18 by the ECU 20 electrically activated devices 30, 40, 50. Each device 30 and 40 is connected to the ECU 20 with pairs of lines 31, 32 and 33, 34, 41, 42 43, 44, and 51, 52 and 53, 54, to supply electric current in opposite directions through devices 30, 40, 50, respectively, for reversible operation of that device 50. Lines 32, 34, 42, 44, 52 and 54 are connected with a reference voltage level provided on line 22 by the electrical ground of vehicle 18 through a reference voltage/ground bus 22' in the ECU 20.

According to the invention, ECU 20 is operably connected with the releasable electrical connector 16 through the electrical conductor 21 and through them with the electric power supply from vehicle 18. ECU 20 is further operably connected with an electric capacitor 60 and with at least one electrically actuated device 30 as will be described so as to selectively control supply of the electricity from the electrical conductor 21 through the electrical connector 16 to the capacitor 60 and to the at least one electrically actuated device 30. The ECU 20 is further configured to intermittently supply electric current from the capacitor 60 to the at least one electrically actuated device 30 such that the at least one electrically actuated device 30 is supplied electric current at a rate in excess of a maximum rate electric current is supplied from vehicle 18 through the electrical conductor 21 to the farm implement 10 for operation of the at least one device 30.

Figure 4:
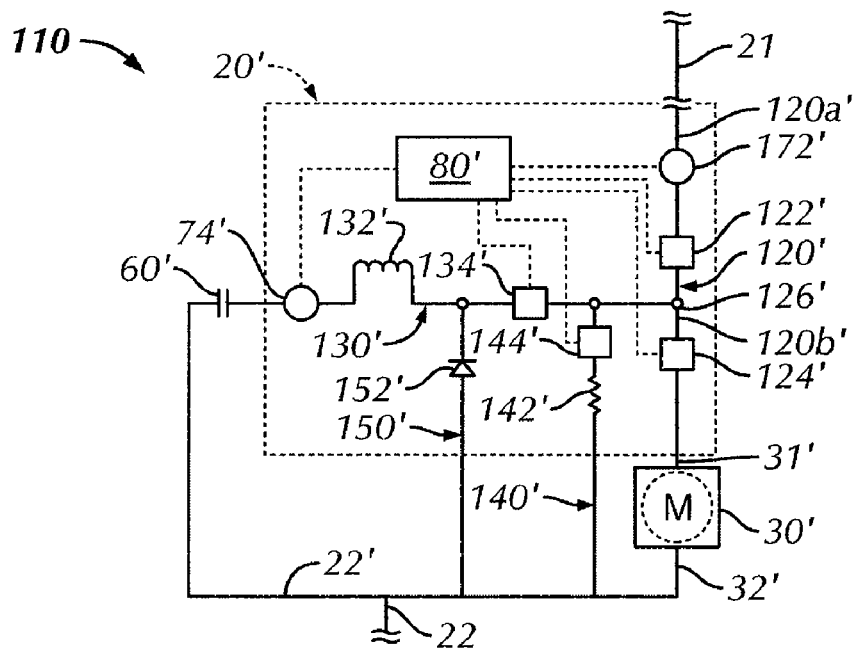
FIG. 4 is a block diagram of a single direction electrical supply connection to an electrically actuated device on a farm implement.

Before proceeding to an explanation of the circuitry connections between the ECU 20 and various electrically actuated devices 30, 40, 50 of FIG. 3, which are all configured for reversible operation, FIG. 4 depicts in more detail, a presently preferred electrical connection indicated generally at 110' within an ECU 20' between at least one electrically actuated device 30' in a farm implement and electric current supplied from the farm vehicle 18 towing or pushing the implement through an electrical power cable 14, electrical connector/plug 16 and electrical conductor 21 for one way actuation. The components of this embodiment with be identified by reference numerals with apostrophes. The same reference numerals without apostrophes will be used in FIG. 5 to identify the same elements in the reversible operation circuits described in that figure. A device 30' that would be operated or actuated in a single direction might be a motor intermittently driving a seed hopper auger in a seed planter as disclosed, for example, in U.S. Pat. No. 6,904,851, incorporated by reference herein in its entirety. A first circuit of the connection is indicated generally at 120' and is configured to pass electricity from the electrical conductor 21 and the electrical connector/plug 16 in a first direction through the at least one electrically actuated device 30'. Preferably, first circuit 120' includes conductor 31' supplying electric current from a source of electrical power, namely a farm vehicle like vehicle 18, to one side of the device 30' and conductor 32' connecting to the other side of the device 30' to a return connection 22' at a reference voltage, preferably ground of the electrical system of the connected farm vehicle 18, to complete the first circuit 120' between the vehicle 18 and the device 30'.

In particular, the depicted first circuit 120' includes a first conductor portion or branch 120a' having a first switch 122', which is effectively located in circuit between the electrical connector 16 and the at least one electrically actuated device 30' and the capacitor 60' to selectively control electricity flowing in a first direction into the first circuit 120' from power conductor 21. First circuit 120' further includes a second conductor portion or branch 120b' with a second switch 124' that is connected with the electrical connector 16 and conductor 21 through the first switch 122' and further connected with the at least one electrically actuated device 30' to separately selectively control current flow in the first direction through the first circuit 120' and through the at least one electrically actuated device 30'. Conductor portions 120a', 120b' meet at an intermediate node 126'. The low end of second switch 124' is connected to device 30' through conductor portion 31'. Conductor portion 32' on the opposite, low side of device 30', is connected with the electrical return conductor 22 through reference voltage/ground bus 22'.

The electrical connection 110' of ECU 20' further includes an inductor 132' in series with the capacitor 60' in a branch line 130' from a first circuit 120'. Branch line 130' is a third branch line of connection 110' and connects a first end, the high end of the capacitor 60' through inductor 132' with the first circuit 120' through node 126'. Node 126' is located between the source of electricity 21 and the at least one electrically actuated device 30' and between the first and second switches 122', 124'. Branch line 130' further connects an opposite, low end of the capacitor 60' with the reference level voltage on return conductor 22, through reference voltage/ground bus 22' in the ECU 20'. Preferably, a third switch 134' of ECU 20' is provided in the branch 130' connected one side with the inductor 132' and capacitor 60' and on another side with the first circuit 120' through the node 126' so as to permit selective connection and disconnection of the capacitor 60' and inductor 132' with the first circuit 120' across the source of electricity 21 and the reference voltage/return 22 or its equivalent 22'.

Finally, the circuitry of the ECU 20' preferably includes additional branch lines. A fourth discharge branch line indicated at 140' includes a resistor 142' connected in series through a discharge switch 144' with node 126' so as to selectively connect the inductor 132' and the high end of the capacitor 60' with the resistor 142' and through the resistor 142' to the reference level voltage through ground bus 22'. Branch line 140' with switch 144' and resistor 142' permits selective discharge the capacitor 60' through the inductor 132' and resistor 142' without actuating the device 30', for example, after shutdown of the implement 10 with a charge remaining on the capacitor 60'. A fifth branch line 150' with diode 152' provides further protection to the inductor 130'.

Capacitor 60' is a high capacity capacitor, also known as an ultra capacitor or super capacitor or electric double-layer capacitor or electrochemical capacitor. High capacity capacitors are characterized by capacitances in excess of one farad. Existing high capacity capacitors are different in construction and operation from capacitors normally found in electronics, which are much less than a farad, typically micro-, nano- or picofarad, in capacity and of a different ("electrolytic") construction and operation. Switches 122', 124', 134' and 144' are preferably field effect transistors (FET's) that can handle the voltage potential and current flow from the vehicle 18 and with the capacitor 60'. First and second switches 122', 124' effectively form half of an H bridge with the device 30'. Preferably, at least switch 134' can be activated intermittently by means of a proportional control system such as one using pulse width modulation (PWM) or pulse modulation (PM), to pass current, particularly for initially charging an empty or nearly empty capacitor 60' from the ECU 20' or discharging a full or nearly full capacitor 60' into the device 30', which may move more current than would normally be supplied by vehicle 18 or drawn by device 30'. The inductor 132' is provided in series on the high side of the capacitor 60' to slew the rise of current passing into and from the capacitor 60' by slewing the current pulses created by pulsed operation of the third switch 134'.

The ECU 20' preferably includes one or more microprocessors (one being indicated at 80') with memory storage and other discrete digital elements (e.g. DAC/ADC, amplifiers, etc) that may be configured into control subcircuits to control the operation of the various switches to control the charging and discharging of the capacitor 60' and to coordinate those operations with the operation of the device 30 as well as the operation of the other devices 40', 50'. The ECU 20' further uses such digital components to control other functions of the implement.

While second switch 124' is shown located on the high side of device 30', it will be appreciated that the second switch 124' can be located on the opposite, low side of the device 30' as is more conventional in a standard H configuration connection. Furthermore, while the discharge branch 140' is shown connected with the capacitor branch 130' through node 126', the discharge branch 140' could be connected directly with branch 130' on either side of the third switch 134'.

Electrical connection 110' of ECU 20' operates by selectively activating the first switch 122' and third switch 134' to pass current while deactivating the second switch 124' to prevent electric current passage for a plurality of first time periods (i.e., pulses through third switch 134) so as to charge the capacitor 60' from the external power supply (i.e., power conductor 21, releasable electrical connector 16) through the first circuit 120', in particular first branch 120a' above the node 126', and through the third branch line 130'. ECU 20' thereafter selectively activates the second and third switches 124', 134', one of them 134' for a plurality of second time periods (i.e. pulses), to provide electric current passage from capacitor 60' through the at least one electrically actuated device 30'. The length and number of pulses would typically be different for charging and discharging the capacitor 60', with charging going on for minutes at a time while device 30' is inactive and going on for merely seconds as the device 30 is activated.

The ECU 20' is further preferably provided with a plurality of sensors to monitor and control current delivery and operation of the capacitor 60'. ECU 20' preferably includes at least a first sensor 172' connected in the first circuit, preferably above first switch 122' to conveniently monitor electrical load in that circuit through voltage or current change. If desired, a second sensor 174' can be located in the capacitor branch line 130' to monitor the capacitor 60' again through voltage or current changes. The third switch 134' might be activated at implement start-up with second switch deactivated to initially charge the capacitor 60' Once operation of the device 30' begins, the third switch 134' might be activated only during peak loading of the device 30 as needed and as determined from the first sensor 172' or in a predetermined way, for example by predetermined lengths of time based upon a known or predetermined cycle of operation of the device 30' once activated. The ECU 20' can be configured to activate the third switch 134' to pass current if either: (1) the voltage across the capacitor is below a predetermined value or (2) the current through the first switch exceeds a predetermined value.

FIG. 4 depicts an ideal, complete circuit for one way control of device 30'. It will be appreciated that simpler circuits could alternatively be used. For example, the third switch 134' can be eliminated and charging and discharging controlled solely by the first and second switches 122' 124' The first switch 122' would be activated via PM or PWM control signals for a first plurality of time periods (pulses) to charge the capacitor while the second switch 124' is deactivated. Thereafter, the second switch 124' would be activated for a second plurality of time periods (i.e. pulses) to pass current from the capacitor 60' or from the capacitor 60' and the external power supply through the first portion 120a' of the first circuit 120' through the device 30' The FIG. 4 embodiment with third switch 134' permits the ECU 20' to selectively supply electric current from the external source through first switch 122' and portion 120a' directly to an electrically actuated device 30', or to the device and the capacitor 60' where the current requirement of the device is low, and to pass current from the capacitor 60' to the device 30' to supplement or replace the external source power supplied through first switch 122' and portion 120a'. The discharge branch 140' is also desirable but not essential and can be eliminated.

Figure 5:
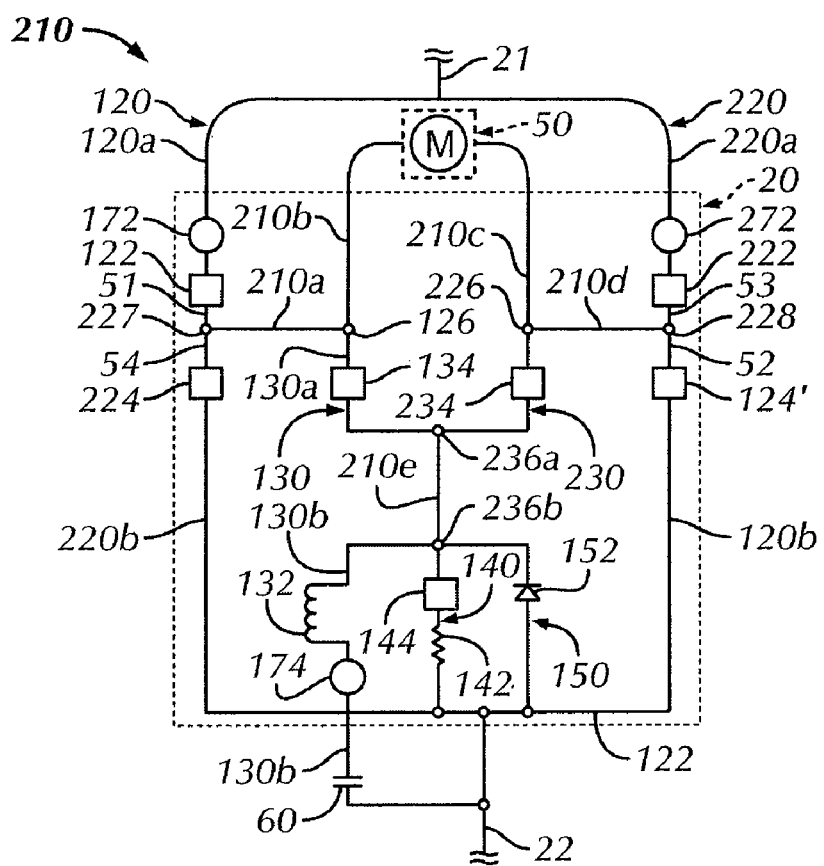
FIG. 5 is a block diagram of a reversible direction electrical supply connection to an electrically actuated device on the farm implement of FIGS. 1-3.

FIG. 5 depicts diagrammatically, another electrical connection indicated generally at 210 within the ECU 20 to couple externally supplied electricity (from conductor 21) with a capacitor 60 and an electrically actuated device for reversible operation of one of electrically operated devices of implement 10, such as device 50. Electrical connection 210 provides a full H bridge across electrically actuated device 50. Electrical connection 210 includes an equivalent of the first circuit 120' designated generally by 120 in FIG. 5 with a first switch 122 between the electrical connector 16 and electric conductor 21 supplying external electric power to the implement 18 and the at least one electrically actuated device 50 to selectively control electricity flowing in a first direction through the first circuit 120 and from conductor 51 through conductor 52. First circuit 120 further includes a second switch 124 connected with the electrical connector 16 through the first switch 122 and further connected with the at least one electrically actuated device 50 to separately selectively control current flow in the first direction through the first circuit 120 and through the at least one electrically actuated device 50. Unlike its position in electric connection 120', second switch 124 is connected with the low side of device 50 for a first circuit 120 in a more convention H bridge configuration.

Second circuit connection 210 further includes a second circuit indicated generally at 220 effectively extending from the one electric conductor 21 and the electrical connector 16 supplying external electric power through the at least one electrically actuated device 50 in a second direction, which is a reverse direction from that of the first circuit 120. Second circuit 220 includes a fourth switch 222 in the second circuit 220 positioned parallel to the first switch 122 between the external power source through electrical connector 16 and conductor 21 and the at least one electrically actuated device 50 to selectively connect the electrical conductor 21 with the at least one electrically actuated device 50 separately from the first switch 122. Second circuit 220 further includes a fifth switch 224 parallel to the second switch 124 and connected in the second circuit 220 with the fourth switch 222 and the at least one electrically actuated device 50 to selectively control electricity through the second circuit 220 and the at least one electrically actuated device 50 in the reverse direction.

Second circuit connection 210 further includes a branch subcircuit indicated generally at 130, that includes capacitor 60 and inductor 132 and that is selectively connected with either the first circuit 120 or the second circuit 220 through either of third and sixth switches 134 and 234, respectively. Prior branch line 130' is equated by a line segment 130a containing the third switch 134, a line segment 130b with the capacitor 60 and inductor 132, and a line segment 210e between nodes 236a, 236b, that connects line segment 130a and another branch line segment 230 containing sixth switch 234, with the capacitor 60 and inductor 132 in line segment 130b for selectively connecting the first circuit 120 or second circuit 220 with the capacitor 60 and inductor 132.

Finally, second circuit connection 210 includes a discharge branch 140 again containing power resistor 142 connected in series through discharge switch 144 with inductor 132 and capacitor 60, this time through a node 236b. Finally, a diode branch 150 with diode 152 is also connected with inductor 132 and capacitor 60, this time through node 236b. A sensor 172 is again preferably provided in the first circuit 120 with a second sensor 174 preferably provided in the capacitor branch 130b. For the full H bridge circuit connection 210 of FIG. 5, a third sensor 272 is preferably provided in the second circuit 210, again preferably above switch 222, to conveniently monitor load in the reverse direction through device 50 and second circuit 220. Branch lines 210a, 210b, 210c and 210d are provided between nodes 227 and 126, between node 126 and the first side of device/load 50, between the second side of device/load 50 and node 226 and between nodes 226 and 228, respectively.

The full H bridge provided by second circuit connection 210 allows device 50 to be selectively driven in opposite directions through the first and second circuits 120, 220, respectively. The capacitor 60 can be connected to either side of the device 50 via third and sixth switches 134, 234, although through only one switch 134, 234 at a time. The capacitor 60 can be charged from either the first or second circuits 120, 220 through activation of first and third switches 122, 134 or the fourth and sixth switches 222, 234, respectively while deactivating the second and fifth switches 124 and 224, respectively. Device 50 can be actuated at peak current loads in a first direction by activating the first, second and third switches 122, 124 and 134 while deactivating the fourth, fifth and sixth switches 222, 224 and 234 and in the other direction by reversing the activations and deactivations. During non-peak load operation, the device 50 can be driven in the first direction through first circuit 120 by activating first and second switches 122, 124 and in the second, reverse direction through the second circuit by activating fourth and fifth switches 222, 224, in the manner of operating a conventional H bridge.

Figure 6:
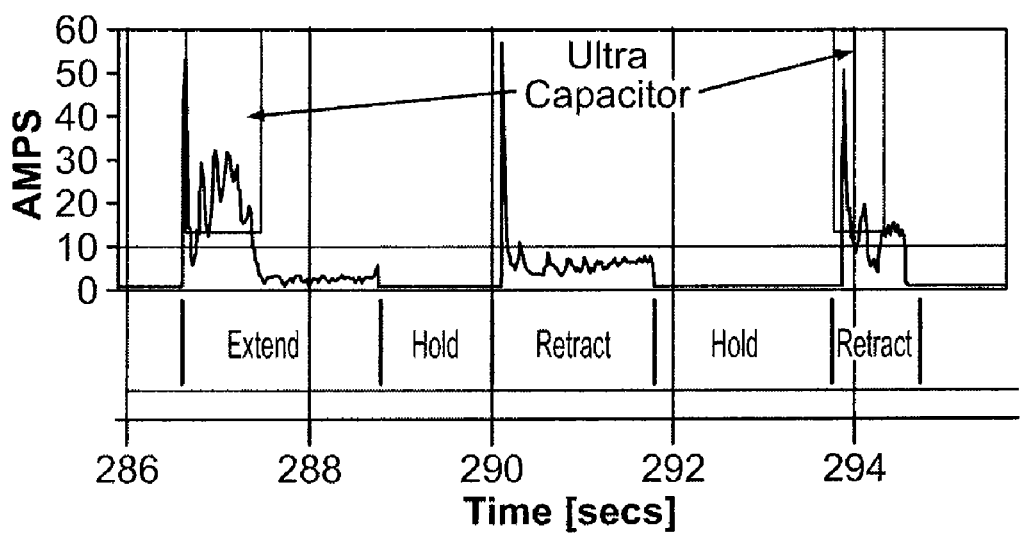
FIG. 6 depicts typical electric load cycles generated by one of the electrically actuated devices of the farm implement of FIGS. 1-3.

As can be appreciated from the foregoing description, the ECU 20 is thus configured to supply electricity to each electrically actuated device of the implement 10 from only the releasable electrical connector 16 and the capacitor 60, 60'. FIG. 6 illustrates a representative load characteristics of one of the electrically operated devices of implement 10, for example net feed device 40 for wrapping a formed bale with netting. The actuator is extended and retracted over a ten seconds per cycle. The actuator draws a relatively high current (in excess of 15 A) for only a very small portion of the cycle. In fact, peak load exceeds 15 A for only about one second or less twice during the wrap cycle. Both portions of the cycle are boxed in FIG. 6. These are the only periods when current would have to be drawn from the capacitor 60. It could be charging all of the other time it is not connected with device 30 (or 40 or 50).

It can also be appreciated from the foregoing description that part of the present invention is a method of operating a farm implement 10 configured for mechanical and electrical coupling with a vehicle 18 for operation, the farm implement 10 including at least one electrically actuated device 30, 40 and/or 50 mounted for operation. The method includes providing an electric connection 14/16 on the farm implement to supply electricity to the farm implement 10 from a source external to the implement, like the vehicle 18 towing or pushing the implement 10 for operation of the at least one electrically actuated device. It further includes supplying the electricity from the electrical connection to a capacitor 60 on the farm implement 10 to store the supplied electricity in the capacitor 60 while the at least one electrically actuated device 30, 40, 50 is not in operation. It further includes intermittently supplying stored electricity from the capacitor 60 to the at least one electrically actuated device 30, 40, 50 to operate the at least one electrically actuated device. The step of intermittently supplying stored electricity can be achieved by selectively connecting the at least one electrically actuated device with the capacitor so as to supply a peak electric current to the at least one electrically actuated device greater that a peak current supplied from the electrical connection 16/21 to the capacitor during the supplying step. The providing step can be achieved by initially connecting the electrical connection 16/21 on the farm implement 10 to a source of electricity of the vehicle 18. Finally, the supplying step can be achieved by measuring voltage across the capacitor 60 and measuring current passing from the electrical connection through the first switch 132 and supplying electricity to the capacitor 60 as long as either: (1) the voltage across the capacitor 60 is below a predetermined value or (2) the current through the first switch 132 exceeds a predetermined value.

Although microprocessor 80' (FIG. 4) or any other microprocessor is not shown in FIG. 5 as part of the ECU 20, it is only being omitted for clarity of the figure. It will be appreciated that all of the switches 122, 124, 134, 144, 222, 224, 234 and all of the sensors 172, 174, 272 are coupled with a microprocessor to control the selective charging and discharging of the capacitor 60 and the operation of the device 50. It will be further appreciated, that it is conventional for operation of the ECU 20 to be selectively controlled, at least in part, by the operator of the vehicle 18 (see the various, previously incorporated US Patents, particularly U.S. Pat. No. 6,446,548).

While charging of the double-layer capacitor 60, 60' on the implement 10 has been described during operation of the implement and the farm vehicle propelling it, the invention includes the provision of such capacitor in a farm implement without means for charging the capacitor from the farm vehicle. In some applications, it may be sufficient or desirable to provide such a capacitor on a farm implement with the ability to charge the capacitor from another source outside the implement, such as a conventional 12 volt battery recharger or other AC current converter, while the implement is not being operated. Thus, in a vehicle propelled farm implement like the aforesaid baler, having at least one electric motor and an electric control system operably coupled with the electric motor to selectively control operation of the motor during use of the farm implement, the invention includes simply the provision of a double-layer capacitor on the implement intermittently operably coupled with the at least one electric motor by the electric control system to intermittently supply electric power to the at least one motor from the capacitor.

While various embodiments of the invention have been disclosed, it will be appreciated by those skilled in the art that other changes could be made to the embodiments described above without departing from the broad inventive concept thereof. For example, while separate circuit connections with separate capacitors 60, 60' are shown, it will be appreciated that by the provision of additional connecting lines with controlling switches, a single capacitor and inductor can be connected with all three devices 30, 40, 50 to provide all the electric current or to supplement electric current supplied by the vehicle 18 through conductor 21 to operate any of the devices. Furthermore, while the capacitors 60, 60' have been shown as being outside the ECU 20, 20' this has been done for clarity and understanding of the invention and it will be appreciated that the capacitor(s) 60, 60', etc., can be fully integrated into an ECU. High capacitance capacitors as might be used in farm implements are available from a number of commercial sources. One ultra capacitor successfully used in a farm implement was a 15V model from Maxwell Technologies of San Diego, Calif. Such capacitors can be obtained with capacitances of from 20 up to nearly 60 farads. Ultra capacitors can be had commercially with capacitances in the thousands of farads, which are unnecessarily large for farm implement use, but nevertheless are available. It is understood, therefore, that this invention is not limited to the particular embodiments disclosed, but it is intended to cover modifications within the spirit and scope of the present invention as defined by the appended claims.

What is claimed:

1. A farm implement configured for mechanical and electrical coupling with a vehicle for operation and comprising:
    at least one electrically actuated device mounted for operation;
    an electric capacitor;
    an electrical power conductor configured to releasably connect with and receive electricity from the vehicle through a releasable electrical connector; and an electric control unit operably connected with the electrical connector through the electrical power conductor and with the capacitor and the at least one electrically actuated device so as to selectively control supply of the electricity from the electrical power conductor through the electrical connector to the capacitor and to the at least one electrically actuated device, the electric control unit further being configured to intermittently supply electric current from the capacitor to the at least one electrically actuated device such that the at least one electrically actuated device is supplied current at a rate in excess of a maximum rate electric current is supplied through the electrical connector to the farm implement.

2. The farm implement of claim 1 wherein the capacitor is an electric double layer capacitor.

3. The farm implement of claim 1 wherein the electric control unit is configured to supply electricity to the at least one electrically actuated device from only the electrical connector and the capacitor.

4. The farm implement of claim 1 wherein the electric control unit comprises:
 a first circuit configured to pass electricity from the electrical power conductor and the electrical connector in a first direction through the at least one electrically actuated device;
 a first switch in the first circuit between the electrical connector and the at least one electrically actuated device to selectively control the electricity flowing in the first direction through the first circuit;
 a second switch in the first circuit connected with the electrical connector through the first switch and further connected with the at least one electrically actuated device to separately selectively control current flow in the first circuit through the at least one electrically actuated device; and
 an inductor located in a branch circuit with the capacitor so as to connect the capacitor with the first circuit between the electrical connector and the at least one electrically actuated device and between the first and second switches.

5. The farm implement of claim 4 wherein the electrical control unit further includes a third switch connected in the branch circuit on one side with the inductor and capacitor and on another side with the first circuit so as to permit selective connection of the capacitor and inductor with the first circuit.

6. The farm implement of claim 5 wherein the electric control unit further includes:
 a second circuit extending from the one electric conductor and the electrical connector through the at least one electrically actuated device in a reverse direction from the first circuit;
 a fourth switch in the second circuit between the electrical connector and the at least one electrically actuated device to selectively connect the electrical conductor with the at least one electrically actuated device separately from the first switch;
 a fifth switch connected in the second circuit with the fourth switch and the at least one electrically actuated device to selectively control electricity through the second circuit and the at least one electrically actuated device in the reverse direction; and
 a sixth switch selectively connecting the second circuit with the capacitor and inductor.

7. The farm implement of claim 4 wherein the electrical control unit further includes a resistor and a discharge switch located to selectively connect the inductor and capacitor with the resistor and selectively discharge the capacitor through the inductor and resistor.

8. The farm implement of claim 4 wherein the electric control unit is configured to:
 activate the first switch to pass current and deactivate the second switch to prevent electric current passage for a plurality of first time periods so as to charge the capacitor from the electrical connector through the first circuit; and
 thereafter activate the second switch for a plurality of second time periods to provide electric current passage through the at least one electrically actuated device.

9. The farm implement of claim 4 wherein the electrical control unit further includes a voltage sensor connected to the capacitor to determine voltage across the capacitor and a current sensor connected located in the circuit to determine current through the first switch and wherein the electrical control unit is configured to activate the third switch to pass current if either: (1) the voltage across the capacitor is below a predetermined value or (2) the current through the first switch exceeds a predetermined value.

10. The farm implement of claim 4 wherein capacitance of the capacitor exceeds one farad.

11. A method of operating a farm implement configured for mechanical and electrical coupling with a vehicle for operation, the farm implement including at least one electrically actuated device mounted for operation, the method comprising the steps of:
 providing an electric connection on the farm implement to supply electricity to the farm implement from a source external to the implement for operation of the at least one electrically actuated device;
 supplying the electricity from the electrical connection to a capacitor on the farm implement to store the supplied electricity in the capacitor while the at least one electrically actuated device is not in operation; and
 intermittently supplying stored electricity from the capacitor to the at least one electrically actuated device to operate the at least one electrically actuated device to operate the at least one electrically actuated device.

12. The method of claim 11 wherein the step of intermittently supplying stored electricity comprises selectively connecting the at least one electrically actuated device with the capacitor so as to supply a peak electric current to the at least one electrically actuated device greater that a peak current supplied from the electrical connection to the capacitor during the supplying step.

13. The method of claim 11 wherein the providing step comprises a preliminary step of connecting the electrical connection on the farm implement to a source of electricity of the vehicle.

14. The method of claim 11 wherein the supplying step further comprises the steps of:
 measuring voltage across the capacitor and measuring current passing from the electrical connection through the first switch; and
 supplying electricity to the capacitor as long as either: (1) the voltage across the capacitor is below a predetermined value or (2) the current through the first switch exceeds a predetermined value.

15. In a farm implement, a control apparatus for charging and discharging a capacitor comprising:
 a first branch including a first switch, said first branch extending between a source of electrical power off the implement and a node;
 a second branch including a second switch, said second branch extending between a load connected to a reference voltage off the implement and the node so as to make a complete circuit partially on and partially off of the implement; and
 a third branch including a capacitor in series with an inductor, said third branch extending between the reference voltage and the node;
wherein:
 said first switch is activated for a plurality of first time periods to charge the capacitor to a predetermined voltage; and
 said second switch is activated for a plurality of second time periods to provide a current to the load.

16. The apparatus of claim 15, said third branch further including a third switch.

17. The apparatus of claim 16, further including a fourth branch including a fourth switch in series with a resistor, the fourth branch extending between the node and the reference voltage.

18. The apparatus of claim 16, further including a sensor which activates the third switch when either: (1) a voltage across the capacitor is below a predetermined value or (2) the current in the first branch exceeds a predetermined value.

19. The apparatus of claim 16 wherein the first switch is connected through the node to a first side of the load and the apparatus further comprises:
- a fourth branch including a fourth switch, said fourth branch extending between the source of electrical power and a second side of the load opposite the first side;
- a fifth branch including a fifth switch connected between the first side of the load and the reference voltage; and
- a sixth branch with a sixth switch extending from another node between the fourth switch and the load, the sixth branch extending between the other node and the third branch;
- a seventh branch including a seventh switch in series with a resistor, the seventh branch extending between the node and the reference voltage;

wherein:
- said first and third switches or said fourth and sixth switches are activated for a plurality of first time periods to charge the capacitor to a predetermined voltage;
- said second and third switches are activated for a plurality of second time periods to provide a forward current to the load;
- said fifth and sixth switches are activated for a plurality of third time periods to provide a reverse current to the load.

* * * * *